Patented June 26, 1951

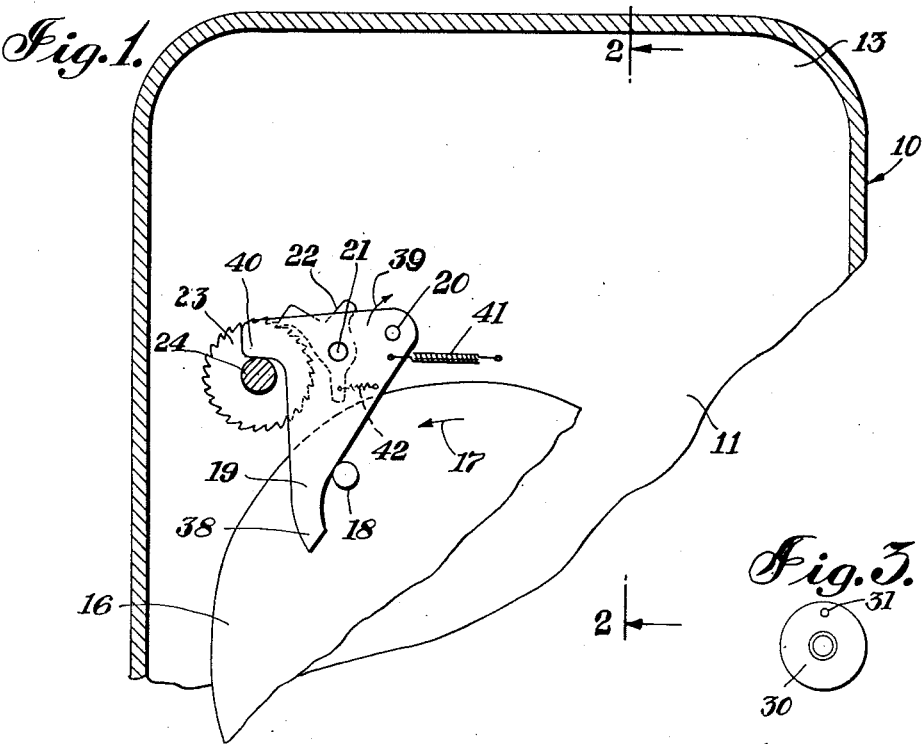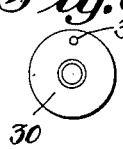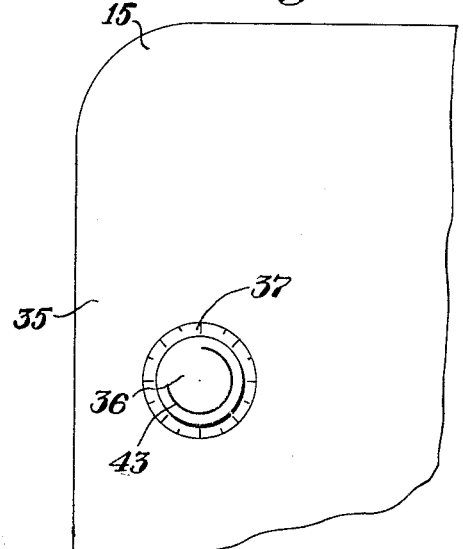

2,558,034

UNITED STATES PATENT OFFICE 2,558,034

COUNTING ARRANGEMENT FOR CINEMATOGRAPHIC CAMERAS

Jacques Bolsey, New York, N. Y.

Application March 26, 1946, Serial No. 657,283

12 Claims. (Cl. 346—17)

My present invention relates to counting arrangements and more particularly to footage counters for cinematographic cameras.

It is an object of my present invention to provide in a cinematographic camera means which mark on a removable film magazine the length of film used during operation of the camera.

It is another object of my present invention to provide in a cinematographic camera means which simultaneously indicate on an outer face of the camera housing the length of film used and mark this length on a removable film magazine arranged within this camera housing.

It is a further object of my present invention to provide a cinematographic camera with a combined indicating and marking footage counter.

I wish to note that the terms "recording means" and "marking means" as used above and in the following description and claims are intended to define the entire recording and marking arrangements including the shaft arranged partly in the film driving compartment and partly in the film magazine compartment and the recording and marking members mounted thereon.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a partial longitudinal section through a cinematographic camera according to my present invention, along line 1—1 of Fig. 2;

Fig. 2 is a partial cross section through the cinematographic camera shown in Fig. 1, along line 2—2 of that figure;

Fig. 3 is a side view of the recording means forming part of the counting arrangement, seen in direction of arrow 3 of Fig. 2; and Fig. 4 is a partial side view of a film magazine forming part of the camera shown in Figs. 1 and 2, seen in direction of arrow 4 of Fig. 2.

Before proceeding with a detailed description of my invention, I wish to stress that this invention consists only in a new marking footage counter arrangement. Therefore, I did not show in the drawings all conventional parts of a camera which have no bearing upon the present invention. I wish to stress, however, that my new counter might be used in combination with film transporting and film exposing arrangements of any type.

The camera shown in Figs. 1 and 2 comprises in usual manner a camera housing 10 and a partition wall 11 forming within this housing two compartments, namely a magazine compartment 12 and a film transporting compartment 13. The magazine compartment 12 can be closed in well known manner by means of the separate camera cover 14. The film magazine 15 is arranged removably in this magazine compartment 12.

In the film transporting compartment 13 the spring drum 16 is turnably mounted. This drum 16 rotates during operation of the camera, i. e. during film transportation and exposure of the film in direction of arrow 17 as indicated in Fig. 1.

In order to operate the film counting arrangement described below in detail, I provide on the spring drum 16 a pin 18. This pin 18 is adapted to engage the lever member 19 which is turnably pivoted to the camera housing by means of pivot 20. The lever member 19 carries by means of pivot 21 the pawl member 22. This pawl member 22 engages, as shown in Fig. 1, the ratchet 23 secured to shaft 24 serving as counting member of the counter arrangement; the pawl member 22 and ratchet 23 act as clutch means permitting turning of the counting member, i. e. shaft 24 in at least one direction without operation of the driving means, i. e. of the spring drum 16.

The spring drum 16 together with the pin 18, lever 19, pivots 20 and 21, pawl 22 and ratchet 23 form the automatic turning means for automatically turning the counting shaft 24 during operation of the camera.

Shaft 24 serving as counting member is freely turnably journalled in two bearing openings, namely in the bearing opening 25 in the outer wall 26 of the camera housing, and in the bearing opening 27 provided in partition wall 11. A manually turnable footage indicating dial 28 serving as adjusting means is secured to the outer end of shaft 24 serving as counting member.

In accordance with my present invention, I secure to the inner end 29 of the counting shaft 24 marking means, i. e. marking member 30 which is slidable in axial direction of shaft 24. This marking member 30 is provided with a marking projection 31 which might be a small piece of graphite or other substance adapted to form a visible line on a marking surface.

In order to prevent sliding off of the marking member 30 from counting shaft 24, I provide at the end of this shaft a pin 32, as clearly shown in Fig. 2. Furthermore, I provide in combination with the marking member 30 a helical spring 33 arranged between this member and the partition wall 11 and permanently forcing the marking member 30 in direction of arrow 34.

As clearly shown in Fig. 2, this marking member 30, and the marking projection 31 secured thereto, are located in the magazine compartment 12; they are both pressed by means of spring 33 against the outer surface of the wall 35 of film magazine 15.

As shown in Fig. 4, I provide on that surface portion of the magazine wall 35 which is contacted by the marking projection 31 a flat marking surface 36 which is preferably provided with footage indications 37.

My new recording footage counter described above operates as follows:

During transportation of the film past the exposure aperture of the camera, the spring drum 16 rotates in direction of arrow 17, as shown in Fig. 1. During such movement, the pin 18 secured to drum 16 hits against arm 38 of the lever member 19 and turns this member about pivot 20 in direction of arrow 39. Such turning movement of the lever member 19 will move the braking edge 40 of this member out of contact with shaft 24 and will furthermore slide the pawl 22 along ratchet 23.

After a certain period of engagement, pin 18 will pass along the tip of arm 38 and thus this arm together with the lever member 19 will be free to be turned by spring 41 in counter-clockwise direction into the position shown in Fig. 1. During such counter-clockwise turning movement of lever member 19, pawl 22 is forced by spring 42 to turn ratchet 23 also in counter-clockwise direction.

Thus, by the above described clutch means including the pawl 22 and the ratchet 23 the counting shaft 24 will be turned forward once each time the spring drum 16 completes a full revolution. It is evident that the degree of turning and thus the position of counting shaft 24 will be in a certain predetermined relation to the length of film transported by the transporting means operated by the spring secured to spring drum 16. Thus, the position of the counting shaft 24 will be an accurate indication of the length of film used during operation of the camera.

Since the adjusting indicating dial 28 serving as adjusting means is firmly secured to the counting shaft 24, this dial will also indicate the length of film used during operation of the camera.

The marking means provided in accordance with my present invention are also operated by turning of shaft 24. For proper operation of these marking means, it is only necessary to properly adjust the position of the marking member 30 and the marking projection 31 secured thereto at the beginning of operation of the camera by turning the adjusting indicating dial 28. That means that if for instance a film magazine containing thirty feet of film is inserted in the magazine compartment 12, it is necessary to adjust the position of the counting shaft 24 by means of the adjusting indicating dial 28 so as to turn the marking projection 31 into a position in which it is located opposite the marking "30" on the marking surface 36 of the magazine.

Turning of the counting shaft 24 by the rotating spring drum 16 will then move the marking projection 31 along the marking surface 36. During such movement, the marking projection 31 will draw on the marking surface 36 a curved footage indicating line 43 reaching from the footage indication "30" to that footage indication which indicates the length of unused film in the magazine. Thus, whenever the magazine is removed from the magazine compartment, it is possible without difficulty to ascertain with one glance at the indicating line 43 on the marking surface 36, the length of unused film in the film magazine.

I wish to stress that various changes and variations might be made in the counting arrangement described above. Thus, for instance, it is possible to provide means for automatically returning the marking means into their initial position each time the camera cover is opened and the film magazine removed.

Furthermore, it should be noted that certain magazines, for instance for so-called double 8 mm. film, contain films which have to be exposed twice. Such magazines are inserted into the camera twice, i. e. once in the usual way and a second time after turning them by 180°. In such a case, it is necessary to provide on both side walls of the camera flat marking surfaces of the type described above.

The term "clutch means," as used in the following claims is intended to cover pawl and ratchet clutch means and similar clutch means which permit turning of the driven member in at least one direction without operation of the driving means while in engagement with the same.

It will be understood that each of the elements described above, or two or more together, may also find a useful application in other types of cinematographic cameras differing from the types described above.

While I have illustrated and described the invention as embodied in cinematographic cameras equipped with removable film magazines, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secure by Letters Patent is:

1. A counting arrangement for a cinematographic camera comprising in combination a camera housing; a magazine compartment arranged within said camera housing; a film magazine adapted to be inserted into said magazine compartment; a turnable counting member turnably arranged within said camera housing; means automatically turning said turnable counting member during operation of said camera; clutch means forming part of said automatic turning means permitting turning of said turnable counting member while the same is in engagement with said automatic turning means; and movable marking means reaching into said magazine compartment in said camera housing and operated by said turnable counting member in such a manner as to move and make records on said film magazine inserted in said magazine compartment whenever the camera is operated and said counting member is turning; and adjusting means arranged outside of said camera housing connected with said turnable counting member for manually turning the same and adjusting thereby the position of said marking means.

2. In a cinematographic camera in combination a camera housing; a magazine compartment within said camera housing; a film magazine inserted in said magazine compartment; a counting member turnably arranged within said camera housing; means automatically turning said counting member during operation of said camera; automatic turning means for automatically turning said rotatable counting member during operation of the camera in one direction, permitting however also turning of said rotatable counting member without operation by said automatic turning means; marking means connected with said counting member and reaching into said magazine compartment so as to make during turning of said turnable counting member markings on said film magazine inserted in said magazine compartment; and adjusting means arranged outside of said camera housing connected with said turnable counting member for manually turning the same and adjusting thereby the position of said marking means.

3. In a cinematographic camera in combination a camera housing; film driving means arranged within said camera housing; a magazine compartment arranged within said camera housing; a film magazine arranged within said magazine compartment; a counting member turnably arranged within said camera housing; means operated by said film driving means and automatically turning said counting member during operation of said film driving means; clutch means forming part of said automatic turning means permitting turning of said turnable counting member while the same is in engagement with said automatic turning means; and marking means connected with said counting member and reaching into said magazine compartment so as to make during turning of said turnable counting member markings on said film magazine inserted in said magazine compartment; and adjusting means arranged outside of said camera housing connected with said turnable counting member for manually turning the same and adjusting thereby the position of said marking means.

4. In a cinematographic camera in combination a camera housing; film driving means arranged within said camera housing; a magazine compartment arranged within said camera housing; a film magazine arranged within said magazine compartment; a counting member turnably arranged within said camera housing; means operated by said film driving means and automatically turning said counting member during operation of said film driving means; automatic turning means for automatically turning said rotatable counting member during operation of the camera in one direction, permitting however also turning of said rotatable counting member without operation by said automatic turning means; marking means firmly secured to said counting member and reaching into said magazine compartment so as to turn together with said counting member during turning of the same by said film driving means; and adjusting means arranged outside of said camera housing connected with said turnable counting member for manually turning the same and adjusting thereby the position of said marking means.

5. In a cinematographic camera in combination a camera housing; a magazine compartment within said camera housing; a film magazine inserted in said magazine compartment; a counting member turnably arranged within said camera housing; means automatically turning said counting member during operation of said camera; clutch means forming part of said automatic turning means permitting turning of said turnable counting member while the same is in engagement with said automatic turning means; and marking means connected with said counting member and reaching into said magazine compartment, said marking means being constructed and arranged so as to contact one face of said film magazine inserted in said magazine compartment and to make on this magazine face during turning of said turnable counting member markings indicating the degree of turning of said counting member; and adjusting means arranged outside of said camera housing connected with said turnable counting member for manually turning the same and adjusting thereby the position of said marking means.

6. In a cinematographic camera in combination a camera housing; a magazine compartment within said camera housing; a film magazine inserted in said magazine compartment; said film magazine having a wall provided with a flat marking surface; a counting member turnably arranged within said camera housing; means automatically turning said counting member during operation of said camera; automatic turning means for automatically turning said rotatable counting member during operation of the camera in one direction, permitting however also turning of said rotatable counting member without operation by said automatic turning means; marking means secured to said counting member and reaching into said magazine compartment, said marking means being constructed and arranged so as to contact said flat marking surface of said film magazine inserted in said magazine compartment and to make on said flat marking surface markings indicating the degree of turning of said counting member; and adjusting means arranged outside of said camera housing connected with said turnable counting member for manually turning the same and adjusting thereby the position of said marking means.

7. In a cinematographic camera in combination a camera housing; film driving means arranged within said camera housing; a magazine compartment arranged within said camera housing; a film magazine arranged within said magazine compartment, said film magazine having a side wall provided with a flat marking surface; a counting member arranged within said camera housing turnably about an axis being normal to said flat marking surface on said wall of said film magazine; means operated by said film driving means for automatically turning said counting member during operation of said film driving means; clutch means forming part of said automatic turning means permitting turning of said turnable counting member while the same is in engagement with said automatic turning means; and marking means provided with a marking tip and connected with said counting member, said marking means reaching into said magazine compartment and constructed and arranged so that said marking tip contacts said flat marking surface on said wall of said film magazine when the same is inserted in said magazine compartment and makes during operation of said film driving means markings on said flat marking surface; and adjusting means arranged outside of said camera housing connected with said turnable counting member for manually turning the same and adjusting thereby the position of said marking means.

8. In a cinematographic camera in combination a camera housing; film driving means arranged within said camera housing; a magazine compartment arranged within said camera housing; a film magazine arranged within said magazine compartment, said film magazine having a side wall provided with a flat marking surface; a counting member arranged within said camera housing turnably about an axis being normal to said flat marking surface on said wall of said film magazine; means operated by said film driving means for automatically turning said counting member during operation of said film driving means; automatic turning means for automatically turning said rotatable counting member during operation of the camera in one direction, permitting however also turning of said rotatable counting member without operation by said automatic turning means; a marking member provided with a marking tip and connected with said counting member slidably in axial direction of the same, said marking member reaching into said magazine compartment; spring means arranged between said counting member and said marking member and constructed so as to press said marking tip of said marking member into contact with said flat marking surface on said wall of said film magazine when the same is in operative position inserted in said magazine compartment, thus enabling said marking member to make during rotation of said counting member by said film driving means markings on said flat marking surface on said wall of said film magazine; and adjusting means arranged outside of said camera housing connected with said turnable counting member for manually turning the same and adjusting thereby the position of said marking member.

9. In a cinematographic camera in combination a camera housing; a partition wall within said camera housing forming a first and a second compartment within the same; a film magazine arranged in said first compartment; film driving means arranged in said second compartment; a counting member arranged within said camera housing turnably journalled in an opening in said partition wall and extending into both said compartments; operating means arranged in said second compartment and constructed so as to turn said counting member during operation of said driving means; clutch means forming part of said automatic turning means permitting turning of said turnable counting member while the same is in engagement with said automatic turning means; and a marking member secured to said counting member at that end thereof which is reaching into said first compartment; and adjusting means arranged outside of said camera housing connected with said turnable counting member for manually turning the same and adjusting thereby the position of said marking member.

10. In a cinematographic camera in combination a camera housing; film driving means arranged within said camera housing; a magazine compartment arranged within said camera housing; a film magazine arranged within said magazine compartment, said film magazine having a side wall provided with a flat marking surface; a counting member turnably arranged within said camera housing; means operated by said film driving means for automatically turning said counting member during operation of said film driving means; a marking member mounted in said camera housing turnably about an axis being normal to said flat marking surface on said wall of said film magazine and slidably in direction of said axis, said marking member being turned by said marking member during turning of the same; a marking tip on said marking member arranged in said magazine compartment facing said flat marking surface of said film magazine; and spring means engaging said marking member and constructed so as to permanently tend to slide the same in axial direction so as to press said marking tip of said marking member into contact with said flat marking surface on said wall of said film magazine when the same is in operative position inserted in said magazine compartment, thus enabling said marking member to make during rotation of said counting member by said film driving means markings on said flat marking surface on said wall of said film magazine.

11. In a cinematographic camera in combination a camera housing; film driving means arranged within said camera housing; a magazine compartment arranged within said camera housing; a film magazine arranged within said magazine compartment, said film magazine having a side wall provided with a flat marking surface; a counting member arranged turnably within said camera housing; means operated by said film driving means for automatically turning said counting member during operation of said film driving means; a turnable marking member rotated by said counting member, said marking member reaching into said magazine compartment; and a marking tip eccentrically mounted on said marking member so as to move along a circle during turning of said marking member and constructed so as to be in contact with said flat marking surface on said wall of said film magazine when the same is in operative position inserted in said magazine compartment, thus enabling said marking member to make during rotation of said counting member by said film driving means arcuate markings on said flat marking surface on said wall of said film magazine.

12. In a cinematographic camera in combination a camera housing; film driving means arranged within said camera housing; a magazine compartment arranged within said camera housing; a film magazine arranged within said magazine compartment, said film magazine having a side wall provided with a flat marking surface; a counting member arranged within said camera housing turnably about an axis being normal to said flat marking surface on said wall of said film magazine; means operated by said film driving means for automatically turning said counting member during operation of said film driving means; a marking member connected with said counting member slidably in axial direction of the same and reaching into said magazine compartment; a marking tip eccentrically mounted on said mounting member so as to move along a circle during turning of said marking member and constructed so as to be in contact with said flat marking surface on said wall of said film magazine when the same is in operative position inserted in said magazine compartment; and spring means arranged between said counting member and said marking member and constructed so as to press said marking tip of said marking member against said flat marking surface on said wall of said film magazine when the same is in operative position inserted in said magazine compartment, thus enabling said marking member to make during rotation of said counting member by said film driving means arcuate markings on said flat marking surface on said wall of said film magazine.

JACQUES BOLSEY.

REFERENCES CITED

The following references are of record in the file of this patent:

UNITED STATES PATENTS

| Number | Name | Date |
| --- | --- | --- |
| Re. 5,252 | Davis | Jan. 21, 1873 |
| 146,604 | Medina | Jan. 20, 1874 |
| 1,118,512 | Power | Nov. 24, 1914 |
| 1,138,785 | Porter | May 11, 1915 |
| 1,620,726 | Howell | Mar. 15, 1927 |
| 1,648,275 | Karling et al. | Nov. 8, 1927 |
| 1,926,703 | Spence | Sept. 12, 1933 |
| 2,391,497 | Wilson et al. | Dec. 25, 1945 |